Dec. 8, 1931.    A. L. WEBRE    1,835,250
VACUUM PAN
Filed May 28 1930
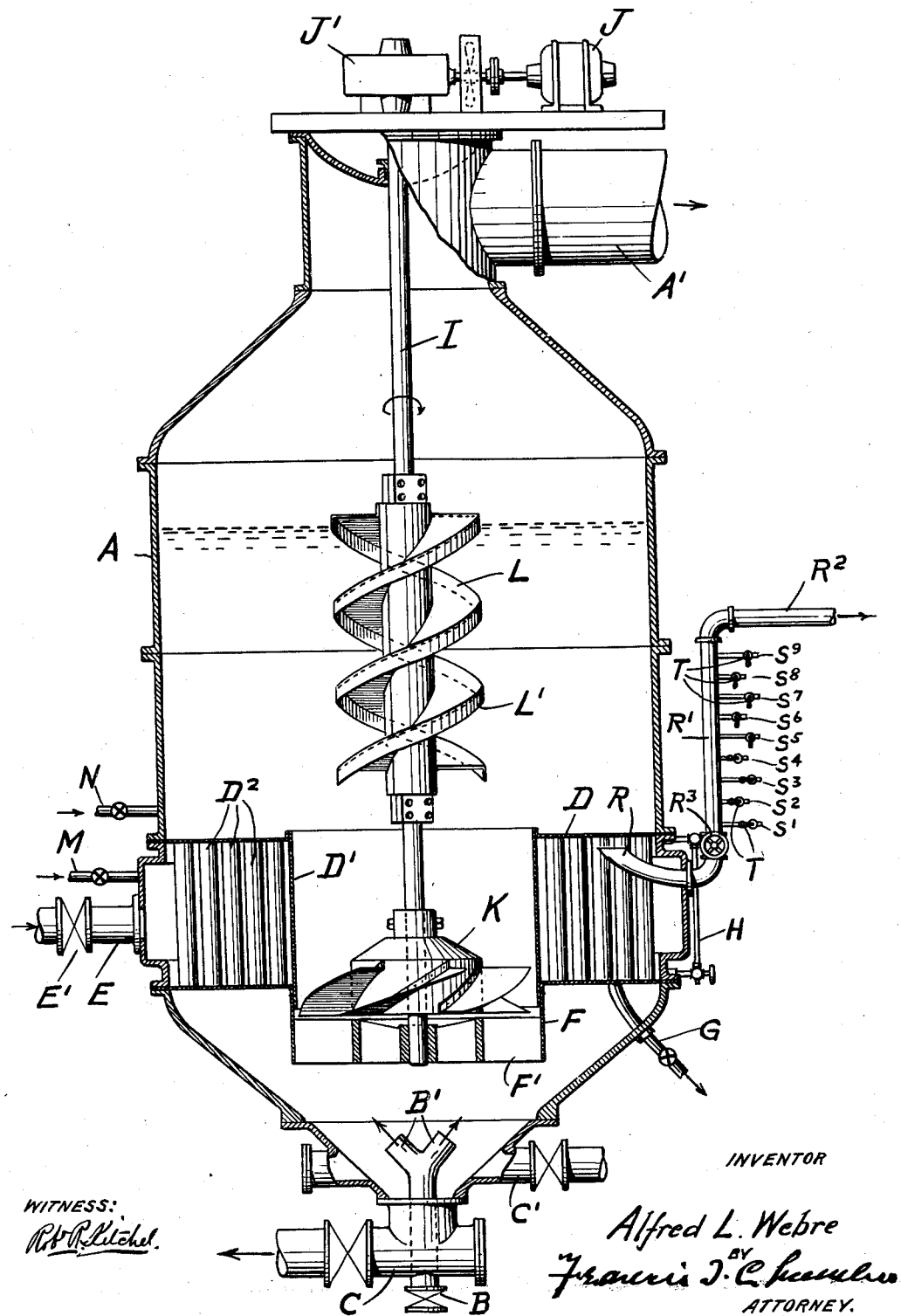
WITNESS:
INVENTOR
Alfred L. Webre
ATTORNEY.

Patented Dec. 8, 1931

1,835,250

UNITED STATES PATENT OFFICE

ALFRED L. WEBRE, OF MERION, PENNSYLVANIA, ASSIGNOR TO UNITED STATES PIPE & FOUNDRY COMPANY, OF BURLINGTON, NEW JERSEY, A CORPORATION OF NEW JERSEY

VACUUM PAN

Application filed May 28, 1930. Serial No. 456,391.

My invention consists of a new method of cooling the contents of vacuum pans, such as are used in the manufacture of sugar. The object is to bring about regulated, gradual and uniform cooling of the said contents of the pans, or "strikes", as they are usually called, for the purpose of promoting therein the growth of the existing sugar crystals by absorption of sucrose from the unexhausted mother liquor or molasses, without at the same time causing the formation of false grains, or minute new crystals, which would either be lost in the molasses at the centrifugals if small enough, or result in clogging up the centrifugal screens, thus interfering with the purging.

My invention is applicable to the type of vacuum pan in which the liquid contents of the pan are heated by a steam belt traversed by tubes through which circulation takes place, and my invention consists in cutting off steam from this steam belt after the "strike" has reached the proper concentration, at which point it would normally be discharged into the crystallizers. The steam belt is then filled with water to a level slightly below the top part, and it is preferable that this water be at approximately the same temperature as the "strike". The cooling is effected by connecting the upper part of the steam belt to the vacuum apparatus which lowers the pressure in the said steam belt until water therein begins to boil, when the temperature of this water will always correspond to the vacuum in the steam belt. As soon as this water reaches a temperature below that of the "strike", this latter begins to cool also, by transferring heat through the tubes to the cooler water, thus causing it to evaporate, but not to heat, since the temperature is fixed by the vacuum maintained. Thus by controlling the vacuum in the steam belt filled with water, the rate of cooling of the "strike" can be regulated positively within the operating limits.

It is important that the cooling of the contents of the pan or "strike" take place gradually and uniformly in order to maintain the supersaturation of the mother liquor or molasses within the limits imposed by practice. This brings about gradual uniform growth of existing sugar crystals, and a corresponding exhaustion of the molasses. If the cooling is not uniform the supersaturation will be insufficient in regions of high temperatures and excessive where low temperatures exist, involving serious danger of forming false grains with the annoyances and losses this involves.

A preferable and important feature of my invention consists in gradually increasing the vacuum in the steam belt charged with water as the temperature of the contents of the pan and of the water in the steam belt decreases so as to maintain a fairly constant differential between the cooling water and the contents of the pan which is being circulated through the tubes, traversing the steam belt charged with water and another preferable feature of my invention consists in maintaining a forced circulation of the contents of the pan through the tubes for the double purpose of increasing the rate of heat transfer and of insuring that no portion of the liquid contents of the pan shall remain in contact with the tubes traversing the water for a sufficiently long time to bring about the formation therein of false grains.

My invention will be best understood as described in connection with the drawing, which is a vertical section through a vacuum pan provided with a steam belt and circulating apparatus and further provided with mechanism adapting it to be used for cooling the contents of the pan in accordance with my improved method, in which A indicates the shell of the pan, which as shown is provided with a conduit B for introducing the liquid to be treated therein, this conduit being shown as provided with two delivery nozzles as indicated at $B^1$. $A^1$ is a conduit leading from the top of the vacuum pan to a condenser, not shown. C indicates a conduit for drawing off the contents of the pan and $C^1$ an additional conduit provided for this purpose. D is a steam belt extending from the walls of the pan provided with a central cylindrical opening indicated at $D^1$ and with a multiple series of tubes indicated at $D^2$. E indicates a conduit for steam leading to the steam belt, $E^1$ indicating a valve for closing this conduit. F indicates a downward extension of the wall of the cylindrical passage extending through the steam belt in the lower portion of which are secured vanes indicated at $F^1 F^1$ for counteracting the swirl given to the liquid by the screw pump, which is employed for bringing about a forced circulation of the liquid contents of the pan. G is a drain pipe leading from the bottom of the steam belt and H a water glass for showing the level of water in the steam belt when the belt is charged with water. I indicates a shaft suspended from the top of the vacuum pan and driven through reducing gear indicated at $J^1$ by an electric motor indicated at J. K indicates a screw pump secured to the shaft I and located in the cylindrical passage formed in the steam belt and L a rotary conveyor also secured to the shaft I extending up to the upper strata of the liquid contents of the pan and formed as shown. M indicates a water conduit leading into the steam belt; N another water conduit leading into the vacuum pan above the steam belt. R indicates the end of the conduit extending into an opening adjacent to the top of the steam belt connected with a continuation indicated at $R^1$, which in turn is connected with a conduit $R^2$ leading to a vacuum pump or condenser, not shown. The conduit $R^1$ during the time when the steam belt is charged with steam for heating the contents of the vacuum pan is closed as by a valve $R^3$. The upright portion $R^1$ of the conduit is provided with a series of connected pipes indicated at $S^1$, $S^2$, $S^3$ etc., each of which is provided with a valve indicated at T.

In operation the vacuum pan is charged with the liquid to be concentrated, sugar syrup, for instance, connected through the conduit $A^1$ with the condenser, steam or vapor introduced into the steam belt and the liquid forced to circulate through the steam belt by the action of the pump K and conveyor L, the liquid passing down through the central opening in the steam belt and upward through the tubes $D^2$. The apparatus shown in the drawings for effecting this circulation is I believe new with me and forms the subject matter of my copending application, Serial Number 456,392, filed May 28, 1930.

When the liquid contents of the pan has reached a proper degree of concentration steam is shut off from the steam belt and water run into it as through the pipe M to a level somewhat below the top of the steam belt. This water when first introduced should preferably be of approximately the temperature of the liquid of the pan. The liquid is continued in circulation through the tubes of the steam belt now partially filled with water and by opening the valve $R^3$ the upper part of the belt D is connected with a vacuum pump or condenser, not shown, operated to maintain a vacuum sufficient to induce the formation of steam from the water contained in the belt and consequently to lower the temperature of this water and of course the liquid circulating through the tubes will be gradually cooled, the rate of cooling being largely dependent on the rate at which heat is withdrawn from the water by generation of steam. This is regulated in the construction illustrated by starting the apparatus with some or all of the pipes $S^1$, $S^2$, $S^3$ etc. open, so that the initial vacuum contained in the belt will be low and as the temperature of the contents of the pan falls these pipes $S^1$, $S^2$, $S^3$ etc. are successively closed so as to maintain a practical uniformity and gradual rate of cooling, resulting in the uniform growth of the crystals contained in the circulating liquid without the formation of false grains or new crystals.

By my method it is practical to bring about in a few hours an accelerated growth of sugar crystals from the incompletely exhausted mother liquor or molasses of the low grade strikes in the pans themselves after the strike is normally finished, without the formation of new crystals or false grains, thus rapidly lowering the purity of the said mother liquor or molasses, and doing in a short time, a large part of the work ordinarily performed in the crystallizers only. This makes possible a great reduction in the number of crystallizers necessary. In addition, with cooled "strikes", the possibility of foaming in the crystallizers disappears and further, there is no necessity of providing air or water cooling after the strikes have reached the crystallizers.

Having now described my invention, what I claim as new and desire to secure by Letters Patent, is:

1. The method of cooling the charge of a vacuum pan having a steam chamber traversed by tubes connecting the upper and lower portions of the pan which consists in cutting off the steam supply to the chamber, charging the chamber with water to a level below the top thereof and then gradually reducing the temperature of the water and through it of the contents of the pan by connecting the top of the chamber to a vacuum apparatus.

2. The method of claim 1 as carried out with a forced circulation of the contents of the pan through the tubes of the chamber.

3. The method of claim 1 as carried out by successive reductions of the vacuum in the chamber so as to effect a step by step cooling of the water in the chamber.

4. The method of claim 1 as carried out by initially charging the chamber with hot water.

ALFRED L. WEBRE.